No. 781,304. Patented January 31, 1905.

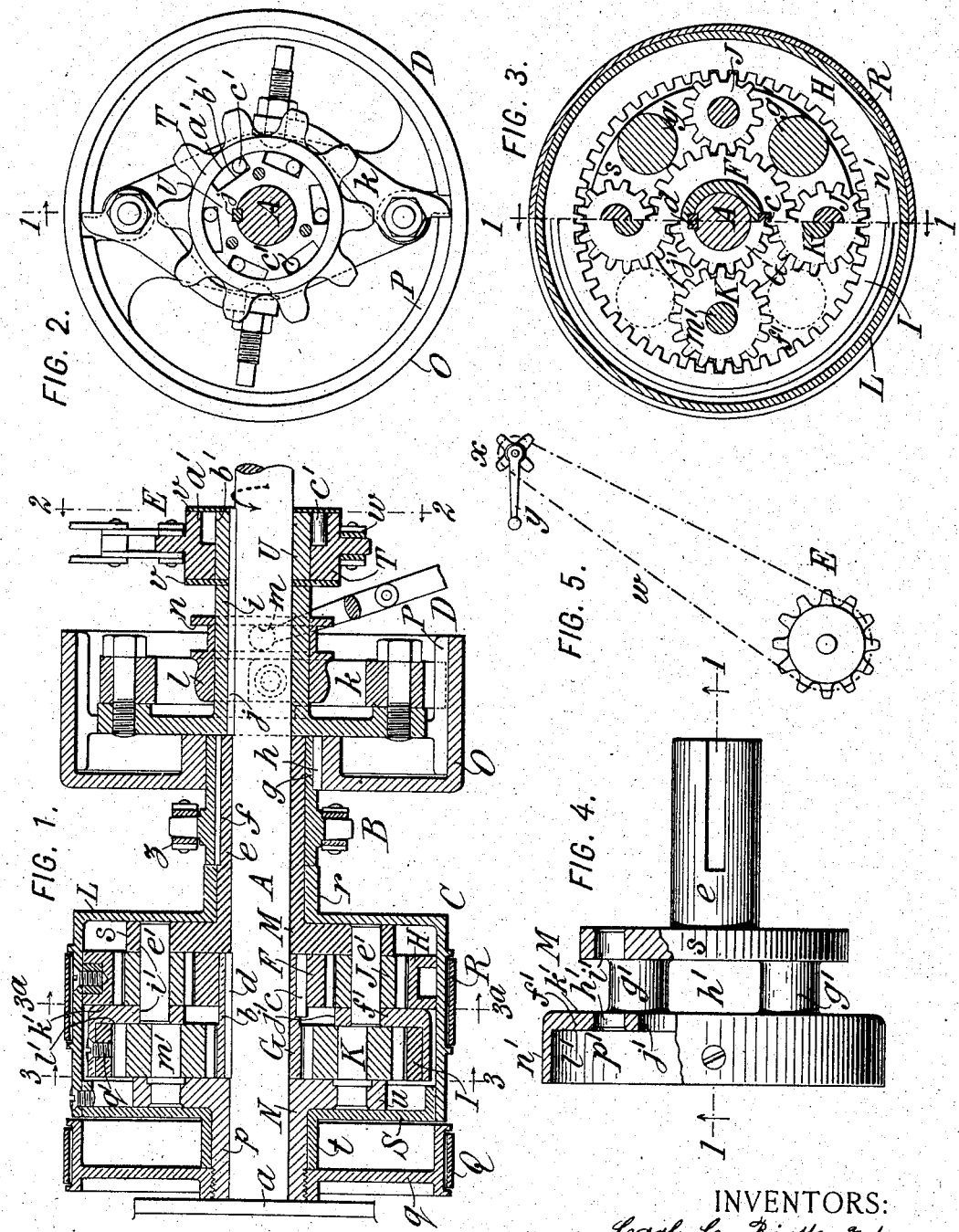

UNITED STATES PATENT OFFICE.

CARL C. RIOTTE AND EUGENE A. RIOTTE, OF NEW YORK, N. Y.

VARIABLE DRIVING MECHANISM.

SPECIFICATION forming part of Letters Patent No. 781,304, dated January 31, 1905.

Application filed March 29, 1901. Serial No. 53,415.

*To all whom it may concern:*

Be it known that we, CARL C. RIOTTE and EUGENE A. RIOTTE, citizens of the United States, residing in the borough of Manhattan, city, county, and State of New York, have jointly invented certain new and useful Improvements in Variable Driving Mechanisms, of which the following is a specification.

This invention relates to driving mechanisms, and especially to the class in which variable speeds or a reverse motion, or either, are obtained from a driving part.

In our application filed December 7, 1899, Serial No. 739,526, we have shown a variable-speed and reverse driving mechanism in which a planet-gear meshing with the shaft-pinion and with an outer rack is carried on an axis revoluble around the axis of the driving-shaft and also revoluble relatively to an adjacent rack meshing with the reversing-gear. In such construction the reversing and the slow-driving racks are relatively stationary, so that the slow forward motion of the driven part is due to the differential character of the gearing, and all transmission from the driving to the driven part is conveyed through the teeth of the gears, and a considerable travel of the gears takes place during either reverse or slow forward driving.

Our present invention relates to an invention which aims in its preferred form to simplify, strengthen, and improve the parts, to relieve the gear-teeth from strain, and to diminish the gear motion incident to variations in speed or direction of movement.

In the accompanying drawings, which show the preferred form of our invention, Figure 1 is a side elevation, partly in vertical axial section, cut on the lines 1 1 of Figs. 2, 3, and 4, of a variable and reversing driving mechanism embodying our improvements. Fig. 2 is an end elevation thereof, the shaft being cut on the line 2 2 of Fig. 1 and looking from the right. Fig. 3 is a transverse section thereof, cut the left-hand side on the plane of the line 3 3 in Fig. 1 and the right-hand side in the plane of the line 3ª 3ª in Fig. 1 and looking in the direction of the arrow. Fig. 4 is a plan view of the gear and rack carrier removed; and Fig. 5 is a diagrammatic end view of the mechanism, showing the separably-connected auxiliary driver.

Referring to the drawings, let A indicate one part, B another part, C the intermediate gearing between these parts, D means for locking the parts together, and E the separable auxiliary driver. The parts A and B may be any usual or suitable members, one of which is to be driven from the other at variable speeds or in reverse direction. As shown, the part A is a shaft, and the part B is a sprocket-wheel. Either of these parts may be the driving part and the other the driven part; but for convenience in describing our improvements we will assume that the part A is a driving part and the part B the driven part, and for clearness these parts will hereinafter be so designated.

We will now describe in detail the embodiment of our invention shown in the drawings.

The driving part A is shown as provided with a flange or head $a$, by which it may be coupled to an engine-shaft or other source of power. To the shaft A is keyed a pinion F, which may for convenience be called a "primary" or "forward-driving pinion," and adjacent thereto, but spaced apart therefrom, is another pinion, G, which may be called the "secondary" or "reverse" pinion, also keyed to the shaft. As shown, the pinion G has an elongated hub $b$, over which the pinion F fits and to which the latter is keyed by a key $c$, the pinion G and its sleeve being keyed to the shaft throughout their length by a key $d$; but either or both the pinions may be formed upon or connected to the shaft in any desired manner. Surrounding the pinion F is an internal rack H, which may be called the "primary" or "forward-driving" rack, and surrounding the pinion G is an internal rack I, which may be called the "reverse-rack." Meshing with the pinion F and the rack H is one or more planetary gears J, and meshing with the pinion G and the rack I is one or more planetary gears K, four being shown in each instance. The rack H is mounted to rotate around the pinion F and is shown as carried within a drum L, revolubly supported by the shaft A. The rack I is mounted to revolve around the pinion G and is movable relatively to the rack H. The gears J are carried on axes mounted to rotate around the shaft A, but fixed in their relation to the driven part B. The gears K are mounted to rotate around the pinion G and are carried on axes movable relatively to the driven part B. A carrier member M, revolubly mounted on the shaft A, carries the gears J and connects them with the driven part B. A carrier N, revolubly mounted on the shaft A at the outer side of the pinion G, carries the gears K. One member of a clutch or other means for locking the shaft and sprocket-wheel together, as the friction-drum O, is rigidly connected to the carrier M, and another member of such means, as the expanding disk P, is rigidly connected to the shaft A. As shown, the driven part B is a separate sprocket fitting over a sleeve $e$ on the carrier M and fixed thereto by a key $f$, and the drum O has its hub fitting over the hub $g$ of the sprocket B and keyed thereto by a key $h$, and the sleeve $i$ of the disk P fits over the shaft and is keyed thereto by a key $j$. The disk P is expanded by the usual levers $k$, the ends of which are separated by the usual spreader $l$ as the latter is slid inwardly along the hub $i$ by the usual fork $m$, engaging the groove $n$. The carrier N has a hub $p$, to which is fixed a brake-disk $q$ for receiving the usual brake-strap or other means Q for holding the carrier stationary. The drum H is engaged by the usual brake-strap or other means R for holding it stationary. The hub $r$ of the drum bears on the sleeve $e$ of the carrier M, between the sprocket B and the body $s$ of the carrier. The open end of the drum is closed by a head S, which has a hub $t$ bearing on the hub $p$ of the carrier N between the disk $q$ and the body $u$ of the carrier.

The auxiliary driver E is mounted to be movable around the shaft A and consists of a sprocket-wheel T, surrounding a hub U, keyed to the shaft by the key $j$, the wheel and hub being held in alinement axially by plates or other provisions $v$, embracing the sides of the wheel and overlapping the sides of the hub. The sprocket T is driven by a chain $w$ from a hand-operated wheel $x$ of relatively small diameter, which is shown as operated by a crank $y$. The sprocket-wheel B is shown as driving a chain $z$. Preferably the clutch or other means D for locking the driving and driven parts together have their respective members connected directly to these parts, so that the gears are relieved of all work during direct driving at full speed ahead. Preferably, also, the auxiliary driver E is connected to the shaft A by a friction-clutch operating to lock the auxiliary driver and shaft together when the speed of movement of the auxiliary driver in a forward direction exceeds that of the shaft and to disengage these parts as soon as the speed of the shaft in said direction exceeds that of the auxiliary driver. This is shown as accomplished by constructing the sprocket T with a cylindrical internal friction-wall $a'$ and the hub U with roller-sockets having tangential bottom walls $b'$ and interposing rollers $c'$ between the opposite faces of the sprocket T and the hub U within these sockets, so that relative movement of those parts in which the sprocket tends to proceed faster than the shaft will cause the rollers to move forward until they bind in the sockets and compel the shaft to move with the sprocket, and movement of the shaft forward relatively to the sprocket will cause the rollers to move to the large end of the socket and release the sprocket from the shaft, in well-known manner. Preferably, also, the sprocket B is interposed between the means for locking the shaft to the driven part and the drum for the variable-speed gearing.

According to our improvement the carrier M supports the axial shafts $e'$ of the gears J at both sides of the latter and has an annular wall or extension $f'$, covering the gears J opposite its body $s$, and intermediate supports $g'$, extending from the body $s$ to the wall $f'$, these parts being preferably formed in an integral casting with the rest of the carrier, so that the spaces $h'$ between the body $s$, wall $f'$, and the braces $g'$ constitute pockets for the gears J, which latter are thus surrounded by the carrier. The body $s$ and wall $f'$ are drilled at $i'$ to receive the gear-shafts $e'$. These shafts are thus effectively supported and great strength is attained, while torsional strain on the gear-shafts is eliminated, and correspondingly-reduced shafts can be employed in order to permit the making of a very compact gear. The extension $f'$ of the gear M has a central aperture $j''$ of sufficient size to permit passage of this part of the carrier over the pinion F, and the diameter of the body $s$ of the carrier is sufficiently small to permit the passage of the body through the rack H. The inner face $h'$, Fig. 1, of the extension $f'$ is finished and overlaps the adjacent face of the rack H, thus serving to keep the latter and the gears J in alinement in one direction, and the opposite face $l'$ of the extension $f'$ is finished and abuts against the adjacent face of the gears K, thus restraining these against axial displacement. As shown, the gears K are loosely carried on studs $m'$, riveted at one end to the carrier N and flush with the gears at the other end, where the only provision for preventing displacement of the gears axially of the studs is the adjacent wall of the extension $f'$ of the carrier M.

Preferably the rack I is revoluble relatively to the rack H and is directly connected to the driven part without any intervening gearing, so that differential reverse driving is unnecessary and the gear travel is reduced to the minimum during reverse operation. Preferably the rack I is directly connected to the gear-carrier M. As shown, this is accomplished by constructing the carrier M with an axially-extending flange $n'$, surrounding the outer edge of its wall $f'$. The flange $n'$ is preferably formed integrally with the rest of the carrier M and is finished on its inner face to receive the rack I, which latter fits into the socket $p'$ within the open end of the carrier and is fastened therein in any suitable manner, as by a screw $q'$. In this way there is obtained a fixed relation between the reversing-rack I and the axes of the forward slow-speed gears J and the driven part B, while the single skeleton casting, the carrier M, inclosed within the gear-drum L, serves to carry these various parts.

The proportions of the pinions F, gears J, and carrier H for a single variable-speed device or of the pinion G, gears K, and rack I for a mere reversing device, or of all these parts for a combined variable-speed and reversing mechanism, will be varied according to speed requirements or circumstances. The proportions shown are twenty-four teeth for the pinion F, twelve teeth for each of the gears J, and forty-eight teeth for the rack H of the variable-speed mechanism and sixteen teeth for the pinion G, sixteen teeth for the gears K, and forty-eight teeth for the rack I of the reversing-gear.

In operation, the shaft A being driven in the direction shown by the arrow thereon in Fig. 1, the rollers $c'$ will revolve idly in the large ends of their sockets in the hub U and the auxiliary driver E will be stationary. If the shaft A is at rest and it is necessary to turn it over by hand to start the motor, as would be the case were the driving power a gasolene-engine, the gear $x$ will be operated by the crank $y$, thus driving the sprocket T forward until the rollers $c'$ bind between the faces $a'$ of the sprocket and $b'$ of the hub U, whereupon the further movement of the sprocket T will be transmitted to the shaft A. As soon as the speed of revolution of the shaft exceeds that of the sprocket T the rollers $c'$ will release and the auxiliary driver will be thrust out of action. When the shaft A is driven and the clutching means D is out of action and the brakes R and Q are released, the shaft will run idly, the resistance of the chain $z$, engaging the driven sprocket B, being sufficient to hold the carrier M stationary. The result will be that the pinion F will drive the rack H and drum L idly and slowly backward through the revolution of the gears J on their axes. At the same time the pinion G will drive the carrier N idly and slowly forward through the running-gears K on the rack I. To communicate full speed ahead to the driven part, the clutch-fork $m$ will be operated to throw the expander $l$ between the tails of the levers $k$, which latter as they separate will spread the disk P within the cap O, which will lock the shaft A and driven part B frictionally and rigidly together. For a reduced forward motion the means for locking the shaft and driven part together will be released and the means for locking the rack H against movement, the strap R in the construction shown, will be applied. As soon as the rack H becomes stationary the carrier M will be driven forward at a reduced speed by the forward travel of the gears J on the rack H. This motion will also carry the reversing-gear I forward at a slow speed, so that the carrier N will be driven forward by the travel of the gears K on the rack I and the pinion G. For a reverse drive the rack H will be released and the means for holding the carrier N against rotation, the brake-strap Q in this instance will be applied. When the carrier N is thus locked against movement, the forward travel of the pinion G will be transmitted in reverse direction and at diminished speed to the rack I, which being fixed to the carrier M will drive the latter and the driven part B backward. During this movement the rack H and drum L will be idly driven backward at an accelerated speed.

It will be seen that our invention provides improvements which can be readily and advantageously availed of, and it will be understood that we do not limit ourselves to the particular details of construction, arrangement, or combination of parts shown as constituting the preferred form of our invention, since our improvements can be availed of in whole or in part, according to such modifications as circumstances or the judgment of those skilled in the art may dictate, without departing from the spirit of our invention.

What we claim is—

For driving-gear, a shaft, a gear-carrier having a hub for revolubly engaging said shaft, a body $s$, a wall spaced apart therefrom, and braces connecting said wall and body at separate points, the parts being arranged with a space between said wall, body and braces, for receiving a gear to be held in juxtaposition to said shaft, all formed in one integral piece.

In witness whereof we have hereunto signed our names in the presence of two subscribing witnesses.

CARL C. RIOTTE.
EUGENE A. RIOTTE.

Witnesses:
FRED WHITE,
THOMAS F. WALLACE.